(12) United States Patent
Romanski et al.

(10) Patent No.: US 7,673,349 B2
(45) Date of Patent: Mar. 9, 2010

(54) HEADWEAR WITH INTEGRATED SPECTACLES

(76) Inventors: Douglas Romanski, 3171 Rolling Green Ct., Milford, MI (US) 48380; Mark Barrett, 25610 W. 7 Mile Rd., Redford, MI (US) 48240

( * ) Notice: Subject to any disclaimer, the term of this patent is extended or adjusted under 35 U.S.C. 154(b) by 134 days.

(21) Appl. No.: 11/439,666

(22) Filed: May 24, 2006

(65) Prior Publication Data

US 2007/0271677 A1    Nov. 29, 2007

(51) Int. Cl.
*A41D 19/00*    (2006.01)
(52) U.S. Cl. ...................................... 2/209.13; 351/155
(58) Field of Classification Search ................ 2/209.13; 351/155
See application file for complete search history.

(56) References Cited

U.S. PATENT DOCUMENTS

| 4,869,586 | A | * | 9/1989 | Chung | 351/158 |
| 5,689,827 | A | * | 11/1997 | Ryder | 2/10 |
| 5,692,234 | A | * | 12/1997 | Yuen | 2/10 |
| 5,826,271 | A | * | 10/1998 | Garrett | 2/10 |
| 6,553,570 | B1 | | 4/2003 | Flynn | |
| 6,662,371 | B2 | * | 12/2003 | Shin | 2/10 |
| 7,147,323 | B1 | * | 12/2006 | Wu | 351/155 |

* cited by examiner

*Primary Examiner*—Katherine Moran
(74) *Attorney, Agent, or Firm*—Steve M. Clemmons

(57) ABSTRACT

A cap in combination with spectacles that are removably coupled to the underside of the cap's visor. The spectacles are pivotally movable from a first deployed position, where the lenses are disposed in front of a user's face to a second stowed position, where the spectacles underlie the visor. The pivoting mechanism is axially biased to provide constant pressure to hold the spectacles in substantially any position.

5 Claims, 4 Drawing Sheets

HEADWEAR WITH INTEGRATED SPECTACLES

FIELD OF THE INVENTION

The present invention relates to headwear and more particularly to hats having integrated pivotally coupled spectacles.

BACKGROUND OF THE INVENTION

Oftentimes it is desirable to wear both a hat and spectacles (e.g., eyeglasses, safety glasses, or sunglasses) simultaneously. Normally, these two accoutrements are separate and distinct items that a user wears. One drawback of this conventional approach is that a user, desiring to remove the glasses, must carry the glasses after removing them. By removing the glasses from his face, the user increases the likelihood of the glasses being lost or being broken.

It is known in the art to couple spectacles to a hat. For example, U.S. Pat. No. 6,553,570 issued to Darcy Lester Flynn discloses a hat having a pair of glasses that are pivotally coupled to the underside of the brim. With this hat, however, the glasses are permanently fixed to the cap, resulting in both the hat and the glasses having to be discarded if either component is damaged or falls out of fashion. Additionally, the hinge mechanism uses complementary radially mounted teeth that intermesh to create an interference fit. This arrangement only provides a fixed number of places where the glasses may be positioned and, due to this intermeshing teeth arrangement, the teeth wear down, thereby destroying the interference fit and causing the glasses to move from a desired location.

SUMMARY OF THE INVENTION

The present invention provides a hat or cap having a forward projecting visor, commonly referred to as the hat's bill or brim. Two mounting studs project from the underside of the visor. A pair of sunglasses is removably coupled to the mounting studs. The sunglasses include a frame that retains the lenses and two pivoting assemblies that are mounted to opposite ends of the frame.

In the preferred embodiment of the invention, each of the pivoting assemblies includes an attachment portion that has a recessed section that is complementary to and receives one of the mounting studs. The attachment portion is coupled to the frame by a pivot pin or screw. A cup or disc spring applies axial pressure against both the attachment portion and the frame, thereby stabilizing and securing the position of the glasses relative to the visor.

It is an advantage of the present invention to provide sunglasses that are removably coupled to the underside of a hat's visor.

It is another advantage of the present invention to provide sunglasses that may be readily removed from the hat without any tools.

It is still another advantage of the present invention to provide sunglasses that are pivotally coupled to the underside of a hat's visor and are movable from a first stowed position beneath the visor to a second deployed position where the sunglasses are positioned in front of a user's eyes.

It is still yet another advantage of the present invention to provide sunglasses that may be pivotally secured in a substantially infinite number of positions relative to the underside of the visor.

Still further objects and advantages of the invention will become readily apparent to those skilled in the art to which the invention pertains upon reference to the following detailed description.

BRIEF DESCRIPTION OF THE DRAWINGS

The description refers to the accompanying drawings in which like reference characters refer to like parts throughout the several views, and in which.

DETAILED DESCRIPTION OF THE INVENTION

Figure 1:
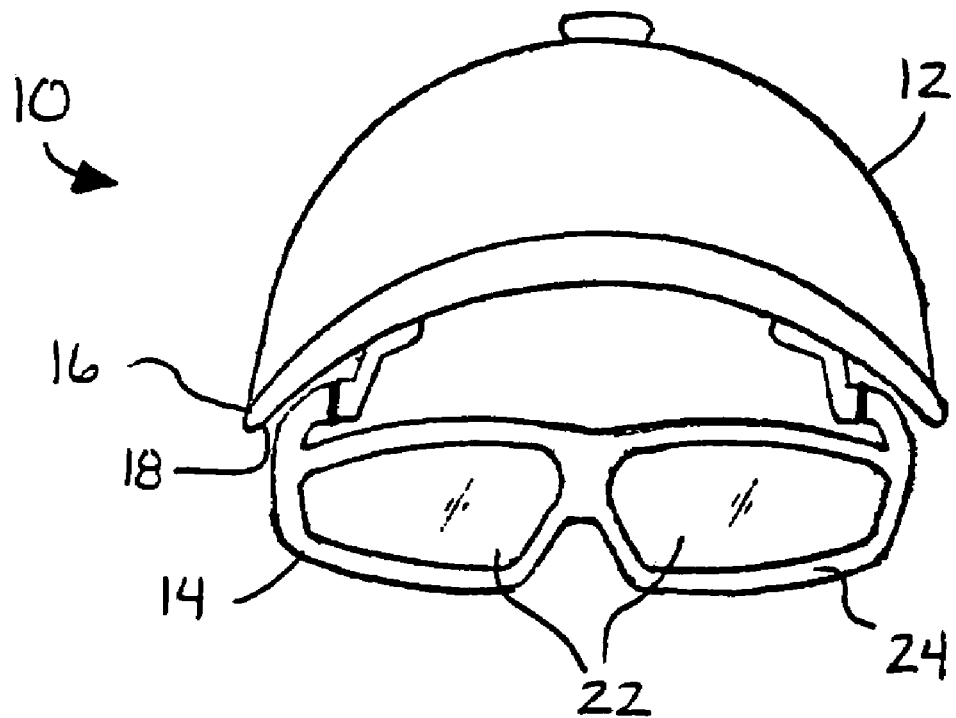
FIG. 1 illustrates a front view of the preferred embodiment of the invention showing headwear having glasses pivotally mounted thereto and disposed in a deployed position.
Figure 2:
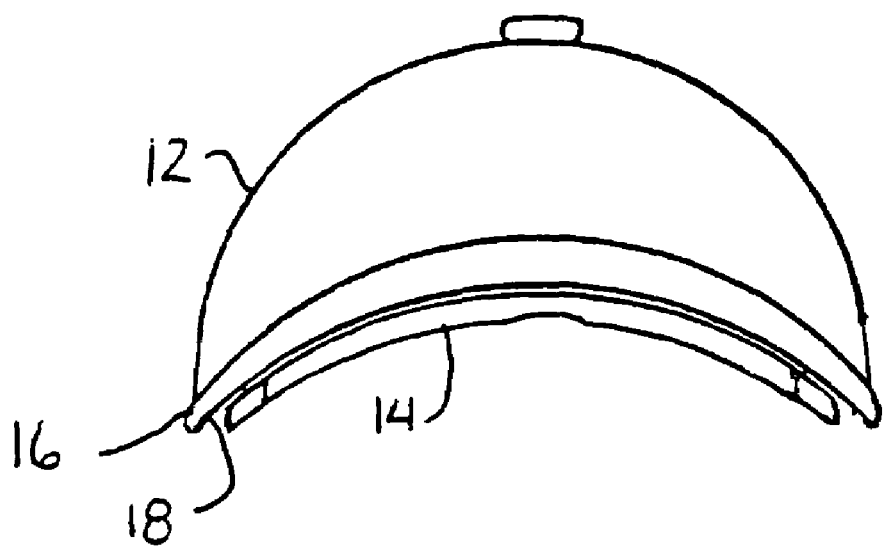
FIG. 2 is a front view of the headwear having the glasses in a stowed position.
Figure 3:
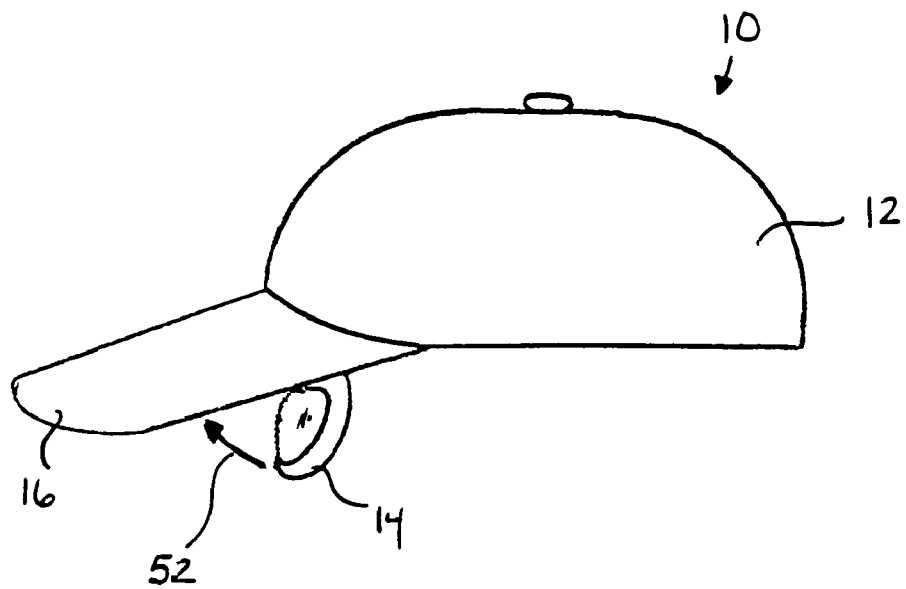
FIG. 3 is a side view of the headwear having the glasses in a deployed position.

Referring to the drawings, FIGS. 1-3 illustrate a preferred embodiment of headwear 10. Headwear 10 is a combination of a hat or cap 12 and spectacles (e.g., sunglasses) 14. Cap 12 includes a brim or visor 16 that projects from the front of the cap.

Visor 16 is curved so that the underside 18 of the visor forms a generally concave shape away from a user's face. Visor 16 is formed from a thermo-set or thermo-plastic material that is relatively flexible, but will hold a pre-set or molded shape. Additionally, the plastic material of visor 16 allows the visor to be slightly deformed, yet will cause the visor to return to the original molded shape.

Visor 16 includes a pair of retention blocks or studs 20 that project from underside 18. Each stud 20 has a generally T-shaped cross-section. The studs 20 are disposed proximate to the two opposing side edges of visor 16 and are positioned such that their T-shaped cross-sections are linearly co-extensive.

Spectacles or glasses 14 are preferably formed as sunglasses, but other types of eyewear may be used instead. Spectacles 14 have at least one lens 22 that are held to a frame 24. Frame 24 has a substantially conventional shape with the exception that the stems of conventional glasses are replaced with a pair of shortened arms 26 that project from opposite sides of frame 24.

Figure 4:
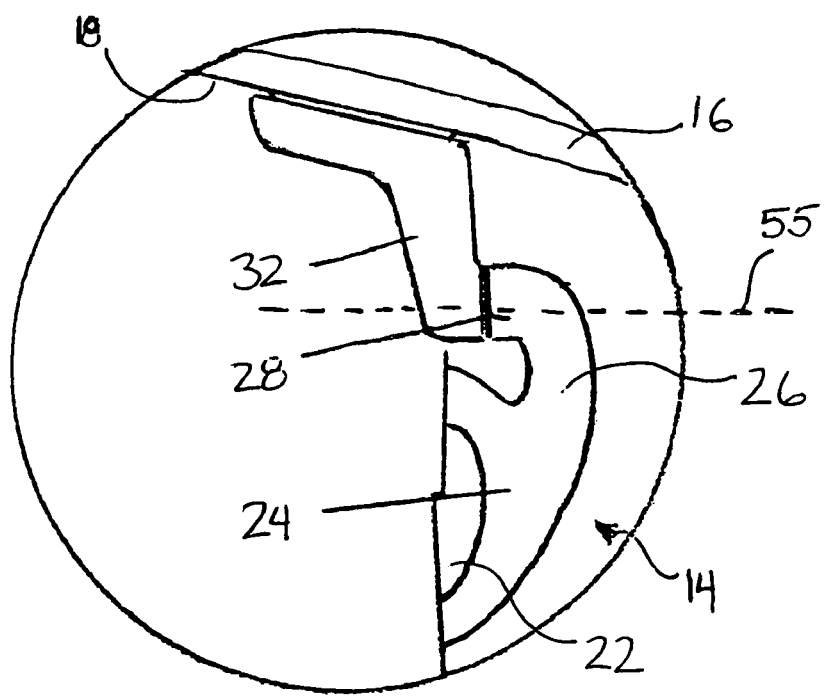
FIG. 4 is an enlarged fragmentary view of the pivoting mechanism shown in FIG. 1.
Figure 5:
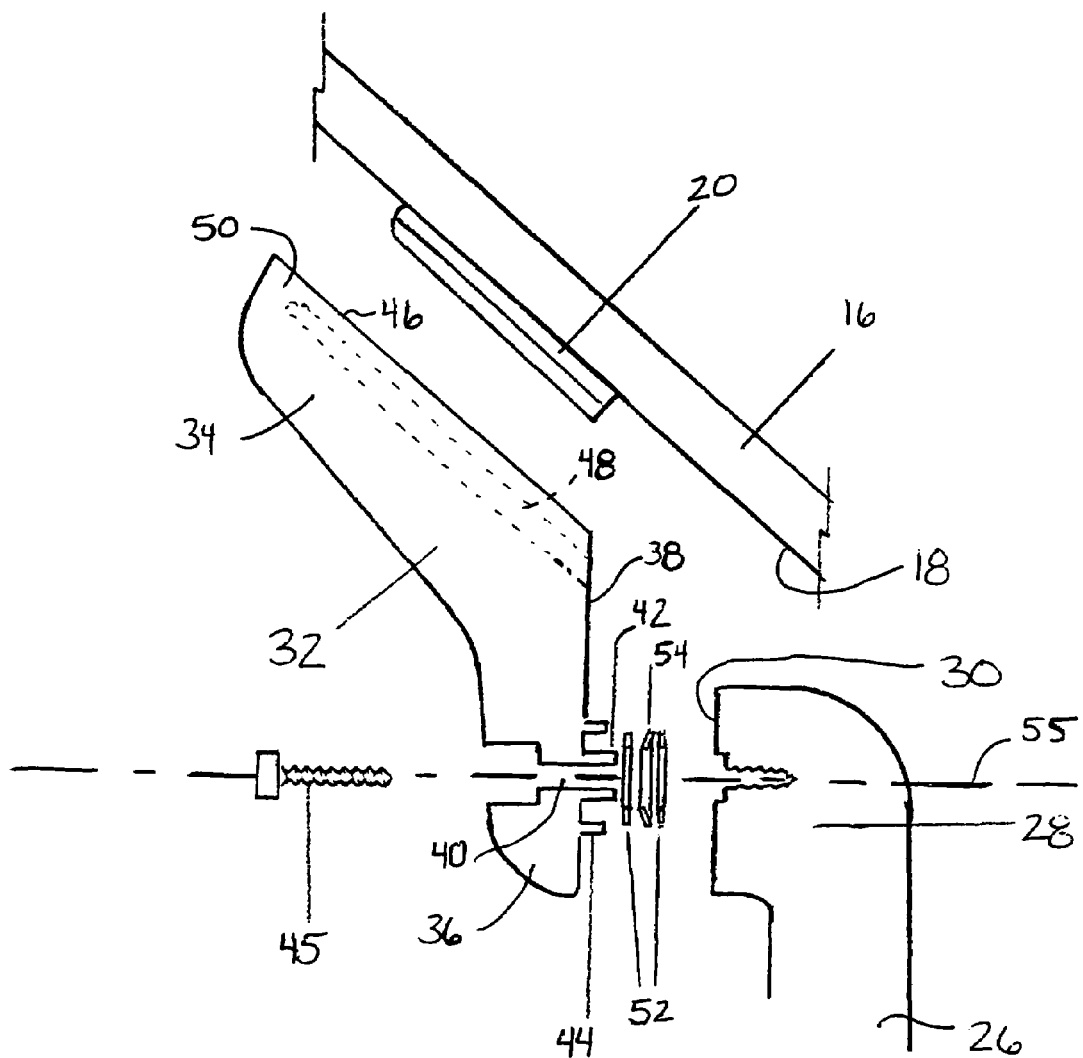
FIG. 5 is a partial exploded view of the pivoting mechanism.
Figure 6:
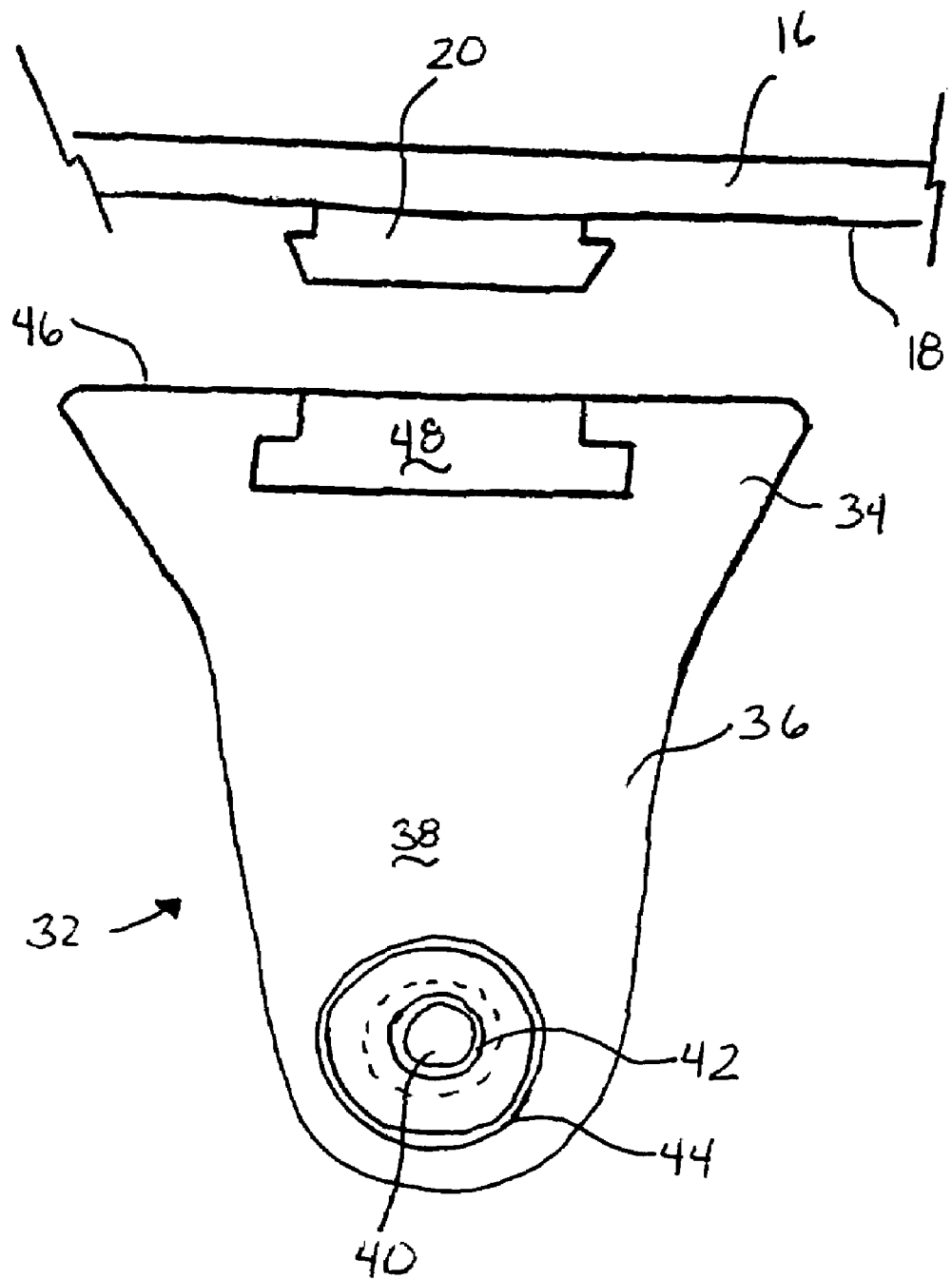
FIG. 6 is a partial side view of the attachment base and mounting stud of the pivoting mechanism.

As shown best in FIGS. 4-6, each arm 26 projects up and away from frame 24. Further, each arm 26 terminates at a generally cylindrical end 28. Ends 28 are positioned such that faces 30 are parallel to each other and cylindrical ends 28 are axially aligned. Arms 26 are preferable integrally formed with the rest of frame 24, but may be coupled to the frame in a conventional manner.

Headwear 10 also includes a pair of attachment bodies 32. Each body 32 includes a generally flat coupling portion 34 and a pivot arm 36 that extends from one end of portion 34.

Pivot arm 36 projects away from coupling portion 34 and includes a flat outer face 38. A through-bore 40 passes through arm 36 perpendicular to face 38. An annular wall or boss 42 extends from face 38 concentric to bore 40. A second outer annular wall or cover 44 also extends from face 38 concentric to boss 42 and bore 40. In the preferred embodiment, boss 42 extends further from face 38 than cover 44. Additionally, bore 40 may be enlarged at the end opposite to face 38 to allow the head of a fastener 45 to be countersunk within the arm 36.

Further, portion 34 of attachment body 32 has a flat upper surface 46 that has a recessed channel 48. Channel 48 passes through face 38 and is shaped complementary to retention stud 20 and is sized to slidably receive stud 20. Channel 48 terminates prior to passing completely through the length of portion 34, leaving a stop portion 50.

As shown in FIG. 5, headwear 10 also includes a pair of wear spacers or washers 52 and a disc or cup spring 54. The washers 52 and spring 54 are sized to fit over boss 42 and within cover 44. Cup spring 54 is disposed between the two washers 52.

Attachment blocks 32 are pivotally coupled to the two arms 26 at their respective cylindrical ends 28 by a conventional fastener 45, such as a self-tapping screw, that passes through bore 40 and into face 30. The spacer washers 52 and cup spring 54 are disposed concentrically around boss 42 such that one of the washers abuts face 38 while the other washer abuts face 30. Cup spring 54 is disposed between the washers and when arm 26 is coupled to pivot arm 36 by fastener 45, cup spring 54 exerts an axial biasing force along the axis of rotation 55, such that any rotational motion of arm 26 relative to attachment body 32 must overcome the resistance from the cup spring pressing against the two washers 52 and faces 30, 38.

The washers 52 are formed from a strong wear-resistant material, such as steel and are effective to receive the pressure exerted by spring 54 and transfer that pressure to the faces 30, 38 without deforming. In the preferred embodiment, fastener 45 is fixedly coupled to arm 26 and pivots with arm 26 (and frame 24) about the centerline of bore 40.

Pivot arms 36 project from body 32 at an angle such that, when body 32 is coupled to retention stud 20, face 38 is substantially vertical and bore 40 is horizontal (relative to the ground when headwear 10 is worn in a conventional manner).

Attachment bodies 32 are removably coupled to the two retention studs 20 by sliding each of the bodies 32 in an inside-out direction, such that the stud 20 passes through the T-shaped channel 48 opening in face 38. Body 32 is slid along stud 20 until the end of stud 20 abuts stop 50.

It should be appreciated that the molded curve of visor 16 and its co-extensive retention studs 20 cooperate with the opposite facing openings of channels 48 to create a constant pressure between studs 20 and attachment bodies 32 thereby holding glasses 14 to cap 12. That is, as best shown in FIG. 2, visor 16 and frame 24 are both curved or arcuate and in one embodiment, the radius (relative to a point below the visor) of visor 16 is smaller than the radius of the arcuatley-shaped spectacle frame 24. Further, studs 20 are spaced apart a distance that is slightly less than the distance between stops 50. In this manner, the arcuate shape of visor 16 and frame 24 cause frame 24 to be compressed and visor 16 (through studs 20) is in tension.

Spring 54 exerts axial force against the pivoting portions (i.e., arms 26, 36) to sufficiently increase the frictional resistance to rotational movement to hold the arms 26 and frame 24 in substantially any selected position. As shown in FIGS. 1 and 3, this position can be a deployed position where the lenses 22 are disposed in front of a user's eyes (when headwear 10 is being worn in a conventional manner). The glasses 14 can be rotated in the direction of arrow 52 to a stowed position shown in FIG. 2 where the glasses 14 underlie the visor 16, such that the front-most surfaces of frame 14 and lenses 22 are adjacent underside 18.

The invention has been described in an illustrative manner, and it is to be understood that the terminology, which has been used, is intended to be in the nature of words of description rather than of limitation. Further, many modifications and variations of the present invention are possible in light of the above teachings. It is, therefore, to be understood that within the scope of the appended claims, the invention may be practiced other than as specifically described.

Having described our invention, we claim:

1. Headwear comprising:
   a hat having a forward facing visor that terminates at a front edge, said visor including a pair of elongated T-shaped studs projecting from the underside of the visor and which run parallel to said front edge; and
   spectacles comprising:
   a pair of arms that extend from opposite ends of a lens retaining frame, the arms each terminating in a cylindrical end having a generally flat face, wherein the cylindrical ends are axially aligned;
   a pair of attachment bodies, each attachment body including a generally flat visor coupling portion and a pivot portion that extends from the coupling portion, wherein each pivot portion has a flat mounting face that is parallel to the faces of the cylindrical ends and having a through-bore formed therein perpendicular to the mounting face, said coupling portion having a channel that passes through the mounting face, the channel having a complementary shape to the studs and terminating at a stop portion distal to the mounting face;
   wherein each of the through-bores are aligned with one of the cylindrical ends and a fastener couples each of the pivot portions to one of the arms; and
   a cup spring disposed between the pivot portions and the arms concentric to each of the through-bores and fasteners, the cup spring is sized to abuttingly engage both the pivot portion and the arms and is in compression when the pivot portion is coupled to the arm.

2. Headwear as provided in claim 1, further comprising an annular boss that extends from each of the mounting faces, wherein the through-bore passes concentrically through the annular boss.

3. Headwear as provided in claim 2 further comprising an annular ring that extends from each of the mounting faces concentric to the through-bore and having a diameter greater than the diameter of the boss.

4. Headwear as provided in claim 2 wherein the cup spring has an inner diameter that is greater than the diameter of the outer diameter of the annular boss and the cup spring is disposed concentrically upon the boss.

5. Headwear as provided in claim 1, further comprising a pair of wear spacers that are disposed on opposite sides of the cup spring concentric to the through-bore, wherein a first of the wear spacers abuts the mounting face and one side of the cup spring and a second of the wear spacers abuts the arm and the opposite side of the cup spring.

* * * * *